United States Patent [19]

Yang

[11] Patent Number: 5,284,582
[45] Date of Patent: Feb. 8, 1994

[54] FAST CONNECTION JOINT OF FITTING OUTLET

[76] Inventor: Ming-Tung Yang, No. 4-3, Lane 97, Lung Chuan St., Taipei Hsien, Taiwan

[21] Appl. No.: 863,072

[22] Filed: Apr. 3, 1992

[51] Int. Cl.$^5$ .............. B01D 24/08; B01D 29/03; B01D 35/02; B01D 35/30
[52] U.S. Cl. .................................. 210/232; 210/238; 210/446; 210/449; 210/460; 210/461; 210/287; 210/136; 285/8; 285/305; 285/340; 285/308; 285/344
[58] Field of Search ............... 210/234, 235, 232, 446, 210/449, 460, 461, 238, 287, 136; 285/8, 305, 340, 308, 344

[56] References Cited

U.S. PATENT DOCUMENTS

| | | | |
|---|---|---|---|
| 2,014,063 | 9/1935 | Brady | 210/449 |
| 2,100,165 | 11/1937 | Holmberg | 210/449 |
| 2,103,425 | 12/1937 | Lehman | 210/449 |
| 2,314,357 | 3/1943 | Lehman | 210/449 |
| 2,328,381 | 8/1943 | Jaffe | 210/449 |
| 2,382,066 | 8/1945 | Klein | 210/449 |
| 2,664,278 | 12/1953 | Aghnides | 210/449 |
| 2,773,601 | 12/1956 | Keller | 210/449 |
| 4,707,262 | 11/1987 | Murken | 285/305 |
| 4,779,904 | 10/1988 | Rich | 285/8 |
| 4,806,248 | 2/1989 | Murken | 285/305 |
| 4,824,565 | 4/1989 | Middleton | 210/449 |
| 4,894,156 | 1/1990 | Murken | 285/305 |
| 4,964,657 | 10/1990 | Gonzales | 285/8 |
| 5,029,908 | 7/1991 | Belisaire | 285/340 |
| 5,195,787 | 3/1993 | Bartholomew | 285/340 |
| 5,199,750 | 4/1993 | Yang | 285/344 |

Primary Examiner—Thomas M. Lithgow
Attorney, Agent, or Firm—Bacon & Thomas

[57] ABSTRACT

This invention is regarding to a fast connection joint for pipe fitting, particularly for those applications where prevention of water spraying in large quantity is required. Its structural design allows connecting or disconnecting an external pipe or faucet, without the need to shut off the water automatically opens when a pipe or faucet is inserted into the connection joint and automatically closes when the pipe or faucet is withdrawn.

1 Claim, 7 Drawing Sheets

FAST CONNECTION JOINT OF FITTING OUTLET

BACKGROUND OF THE INVENTION

Known connection joints for common fittings comprise simply tapped threads or joints wrapped with tape seal, or seal oil at their outlet to assemble and connect external pipes or faucets. A water valve or manifold valve must shut off during assembly procedures, otherwise, water flow running in the pipe will spray out all over the ground. Also, water pressure inside the pipe might cause failure of the connection if the parts of the assembly are not tightly fastened. This phenomena may result in future water seeping or leaking problems.

SUMMARY OF THE INVENTION

A fast connection joint for a fitting outlet is particularly employed for an external pipe or faucet connection and comprises an expansion ring, claw check ring, snake tail ring, filter ring and swing check valve.

It is easy to plug in or pull out while connecting or removing external piping or faucet without shutting off the water supply.

DETAILED DESCRIPTION OF THE PREFERRED EMBODIMENT

Figure 1:
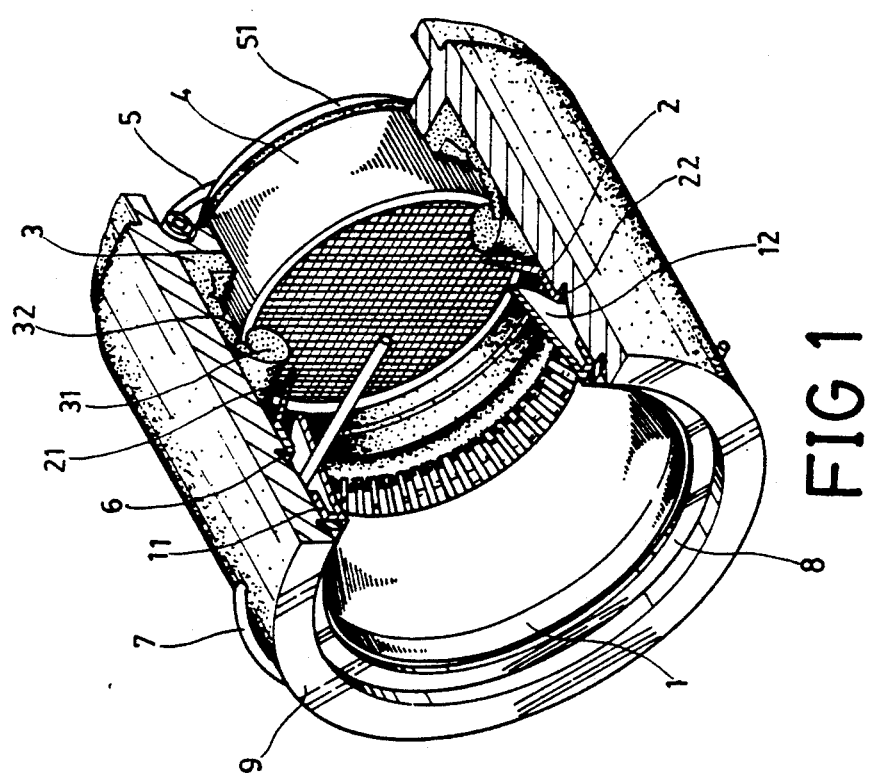
FIG. 1 is a perspective, cross-sectional view of this invention.
Figure 2:
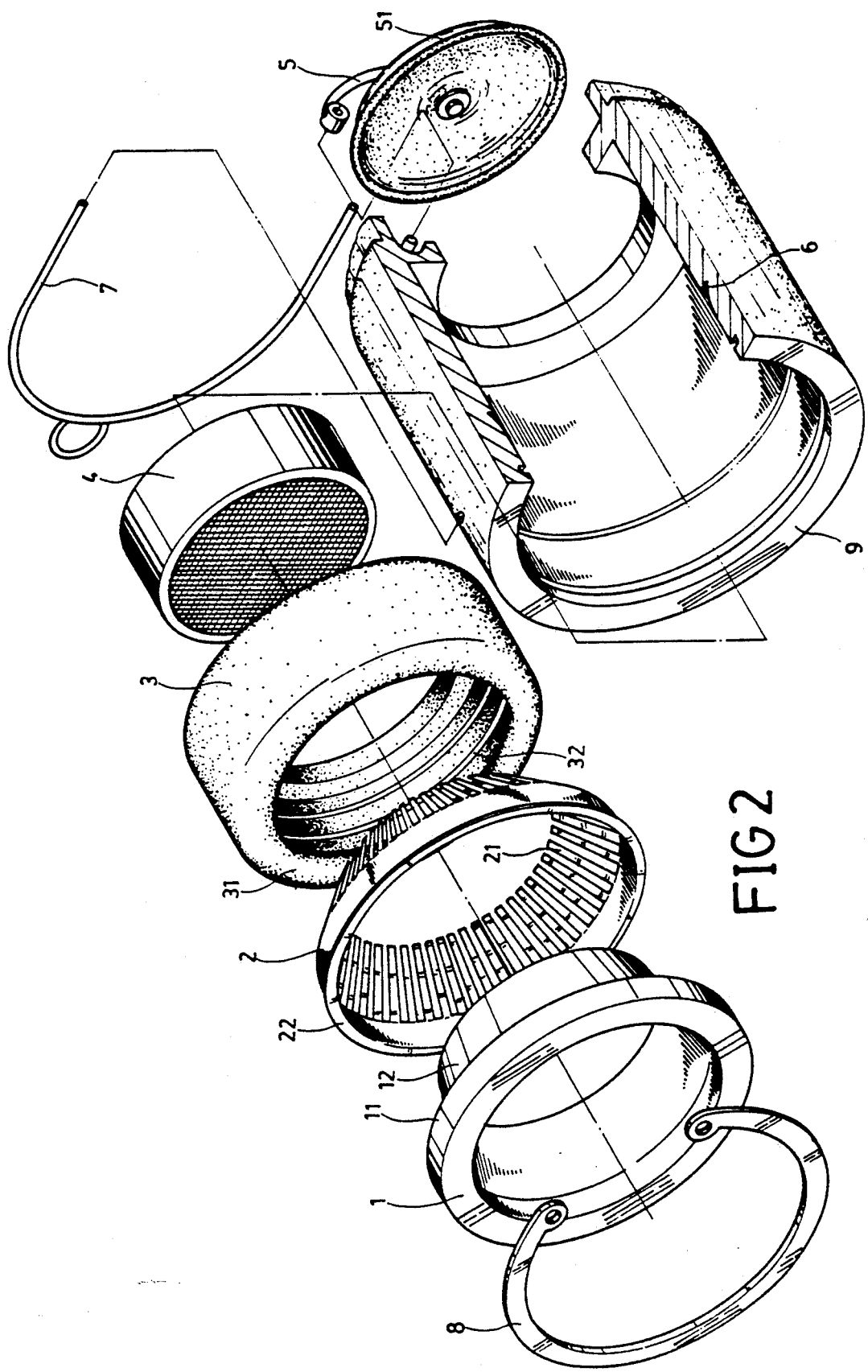
FIG. 2 is an exploded perspective view partially in section of this invention.
Figure 3:
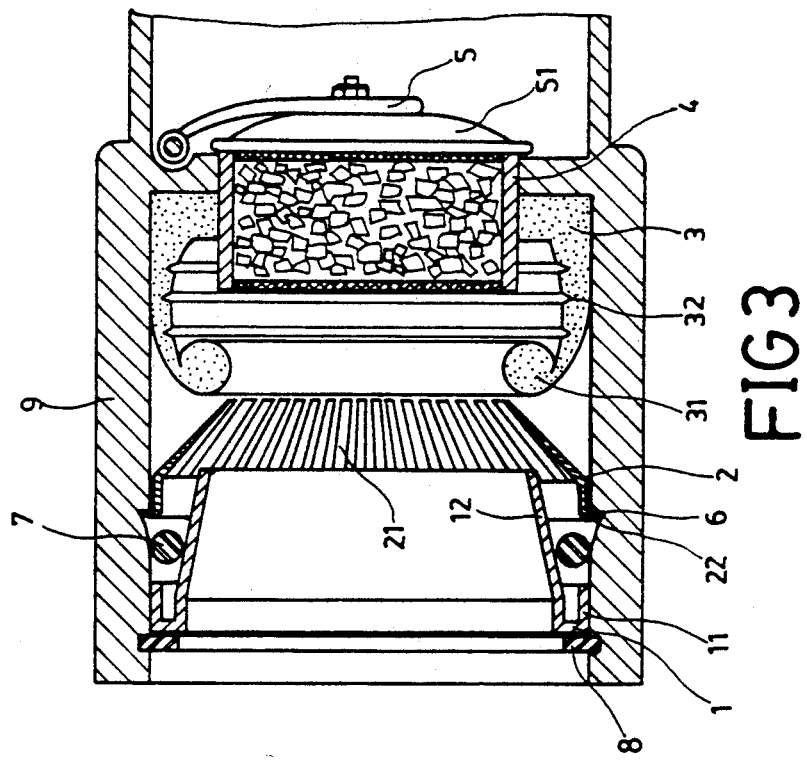
FIG. 3 is a cross-sectional side view of this invention.

Please refer to FIGS. 1, 2 and 3. This invention is a fast connection joint used for a fitting outlet. It can easily and conveniently be connected to a fitting outlet without additional tool or shutting off the water supply. Its components including an expansion ring (1), a claw check ring (2), a snake tail ring (3), a filter ring (4) and a swing check valve (5) located in housing 9. The swing check valve (5) is located at one side of the connection joint and comprises a movable valve disc which can shut off water flow with respect to water pressure. Filter ring (4) comprises an accessible and replaceable filtration material positioned inside the connection joint near the swing check valve (5). The filter ring's outside diameter is designed to match the insertion pipe's outside diameter. Therefore, it becomes a thrust element after the insertion pipe is inserted into the connection joint and moves filter ring (4) toward the swing check valve to set the valve disc (51) at an open state so the water flow can run through the connection joint. After the insertion pipe is removed, the filter ring will lose its external force and can no longer prop the valve disc open. The swing check valve will then automatically close. Snake tail ring (3) is a plastic, annular part which is placed between an outer edge of the filter ring and connection joints internal wall. The snake tail ring (3) has a rolling-ball-shape ball ring (31). A pass hole formed by ball ring is slightly smaller than the outside diameter of an insertion pipe and its internal surface has several annular slots (32). This arrangement will cause internal and external edge surfaces to be non-uniformly stressed. The ball ring will start to curl inward after an insertion pipe has entered the pass hole because the pipe surface will rub the internal surface of the front end of the ball ring and, in turn, push the ball ring forward due to the insertion pipe's friction. The deeper the pipe is inserted, the more the ball ring curls such that it becomes bigger and bigger and finally will totally cover the gap between the outer surface of the insertion pipe and the internal wall of connection joint to form a water seal. Claw check ring (2) is a ring-shaped part possessing elastic and hard characteristics. It's assembled inside the fitting and near the snake tail ring. One side is notched to form claw-like ring's teeth (21). A pass hole formed by the teeth tips is smaller than the outside diameter of an insertion pipe so that it can tightly and elastically be fitted to the insertion pipe's outside diameter. A tail foil (22) is located at an opposite side facing outward and comprises one-way check slots to match the internal wall of the fitting. The claw-like ring teeth (21) will expand slightly to press against the external wall of the insertion pipe when the insertion pipe enters the fitting. However, it won't move backward with the pipe because of pin (7) inserted from the external side of fitting and installed at the rear side of claw check ring (2). Because the insertion pipe is clamped by the claw-like ring teeth after it enters into the connection joint and the pin (7) stops the claw check ring (2) from moving backward, the insertion pipe cannot be pulled out.

Expansion ring (1) is a hard and solid ring part having a short plate (11) placed between the pin's rear edge and a C clamp (8) located at an end of the connection joint. A long plate (12) of expansion ring (1) will approach internal edges of claw-like ring teeth (21) of the claw check ring (2). Also, the pass hole formed by the long plate of the internal ring is bigger than the outside diameter of an insertion pipe. A C-type snap ring (8) is installed at an outer edge of the expansion ring, i.e., the farthest side inside the fitting outlet.

The function of this snap ring is to prevent the expansion ring from moving backward. Therefore, the claw-like ring teeth will be expanded to release their clamping of the insertion pipe by the long plate (12) of expansion ring (1) after pulling out the pin (7) and allowing claw check ring (2) to move backward with the insertion pipe. At this stage, the insertion pipe can be smoothly pulled out of the fitting outlet, and no additional tool is required. It's simple and easy to complete the separation of the insertion pipe.

Figure 4:
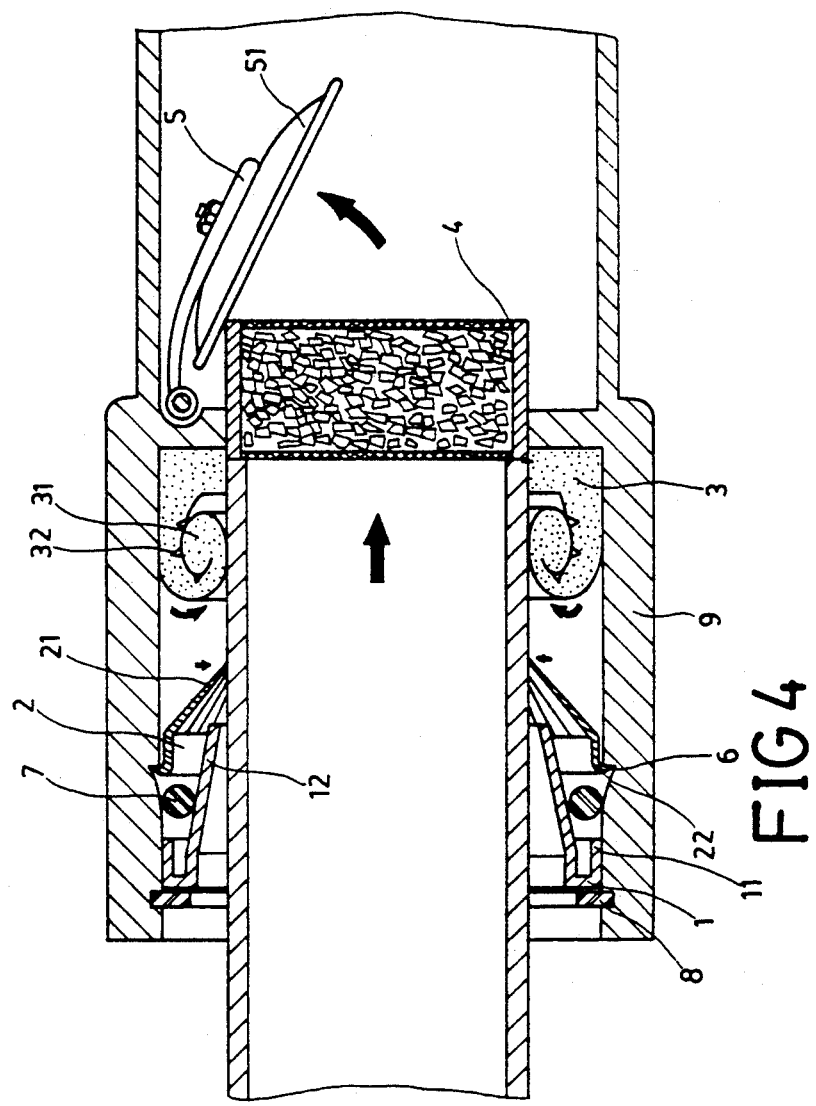
FIG. 4 is a schematic, cross-sectional side view showing the insertion of a pipe into the fitting of this invention.
Figure 5:
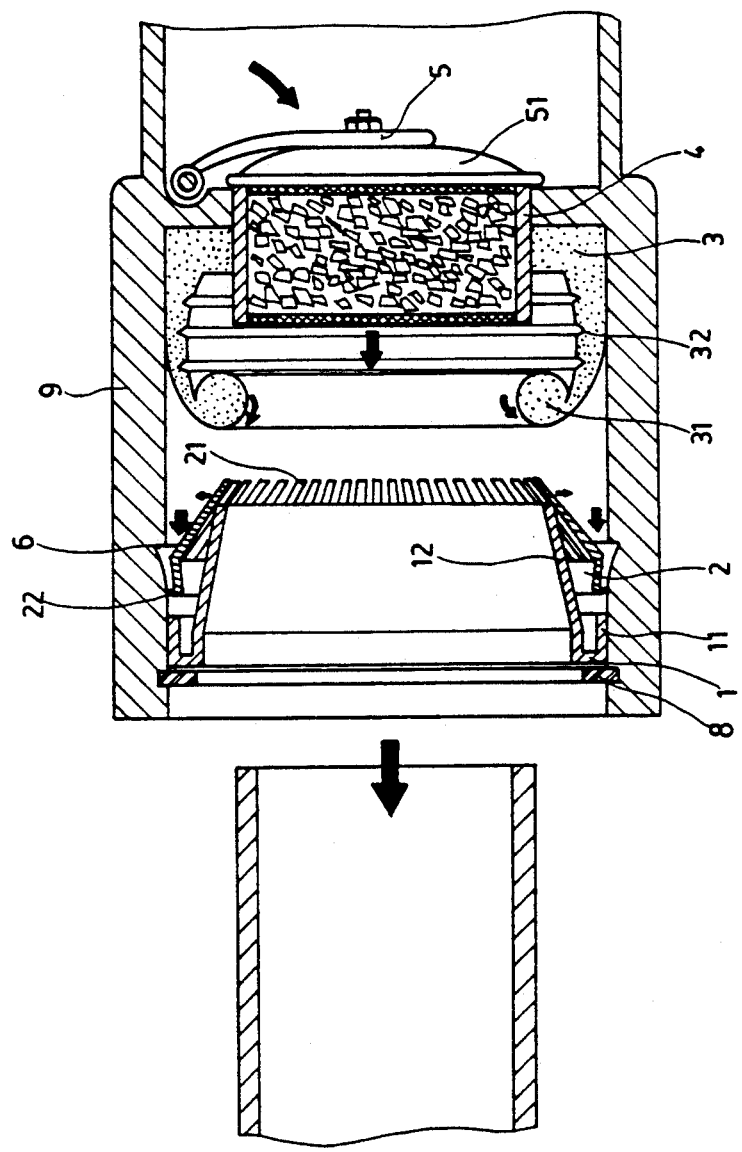
FIG. 5 is a schematic cross-sectional side view showing the withdrawal of a pipe from the fitting of this invention.

The integrated assembly components are connected to an external pipe or faucet as shown on FIG. 4 simply and directly plugging the desired end of the insertion pipe into the fitting outlet to have the claw-like ring teeth to claw check ring firmly clamp the outer surface of the insertion pipe. Pin (7) stops claw check ring (2) from moving backward. Consequently, the insertion pipe cannot be moved back to separate from the fitting. The push forward of the insertion pipe to curls the ball ring (31) of snake tail ring (3) to entirely cover the gap between the insertion pipe and the interior of the fitting. Meanwhile, the front pipe end of insertion pipe will cause filter ring (4) to move forward to push the valve disc (51) of swing check valve open to let water flow through. Referring to FIG. 5, when pulling out the insertion pipe is desired, the pin (7) is pulled out to release the restraint of the claw check ring (2). Then a force is applied to the insertion pipe to pull it outwardly. At this moment, no restraint is applied to claw check rig (21) so it can move backward with the insertion pipe. Expansion ring (1) sill be stopped by C-type snap ring (8) from moving backward when claw-like ring teeth (21) contact the long plate (12) of expansion ring (1). Long plate (12) of the expansion ring will open claw-like ring teeth to release the teeth's clamping against the outer surface of the insertion pipe, so that the insertion pipe can be easily pulled out.

Simultaneously, filter ring (4) loses the force exerted by the insertion pipe which will let water inside the pipe close the valve disc of swing check valve and reset the filter ring to its original position, so water flow inside the pipe won't leak. There may be a small quantity of water accumulated in the internal space which will flow out, but the phenomena of water spraying in large volume is prevented. A long and detailed description regarding the action of plug in assembly and separation has been made earlier in this paragraph. However, in actual practice, assembly motion is only one insertion action, and only pin removal is needed prior to pull out the insertion pipe. Both actions can be done simultaneously.

Figure 6:
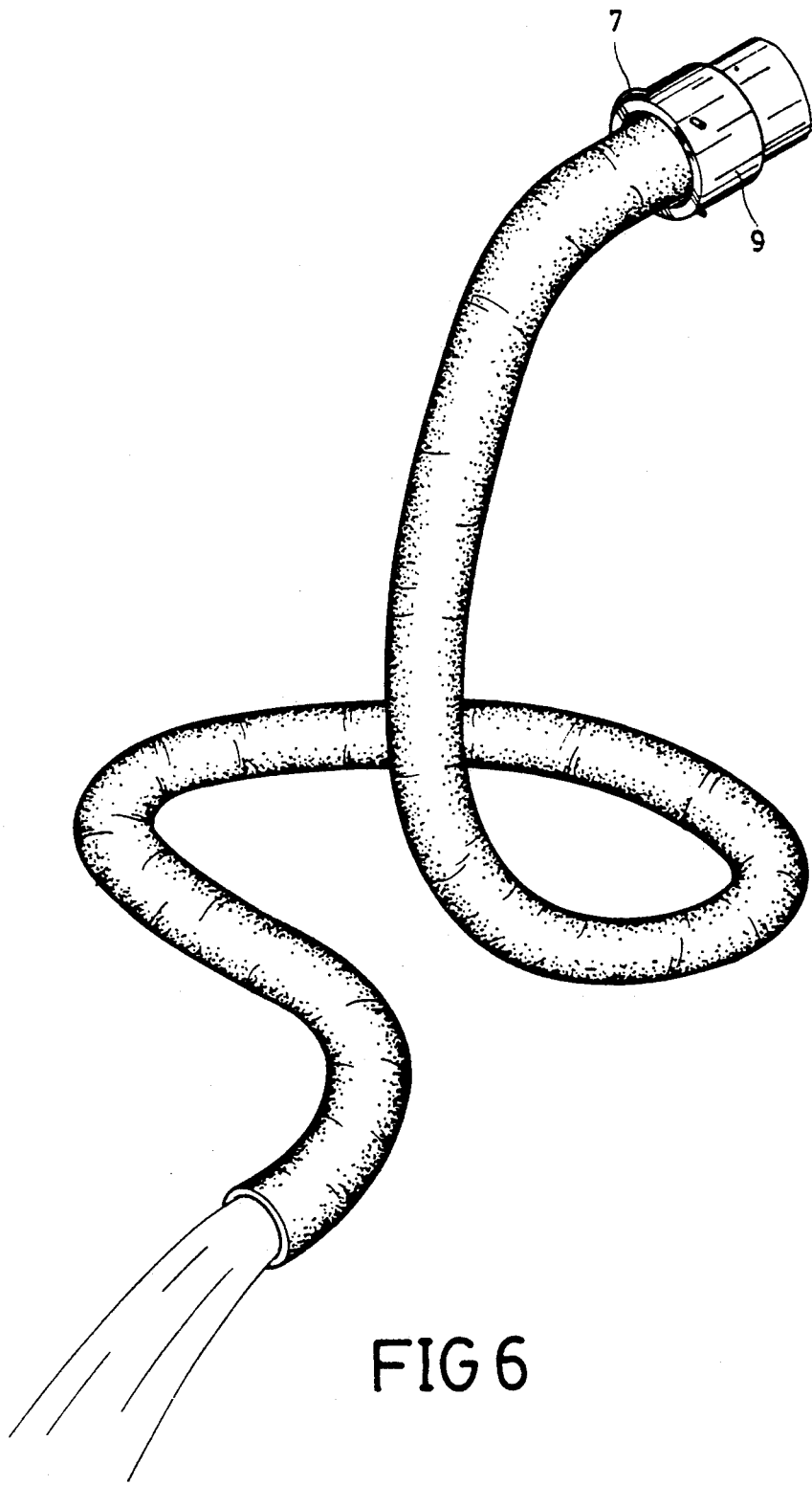
FIG. 6 is a perspective view showing one use of the fitting of this invention.
Figure 7:
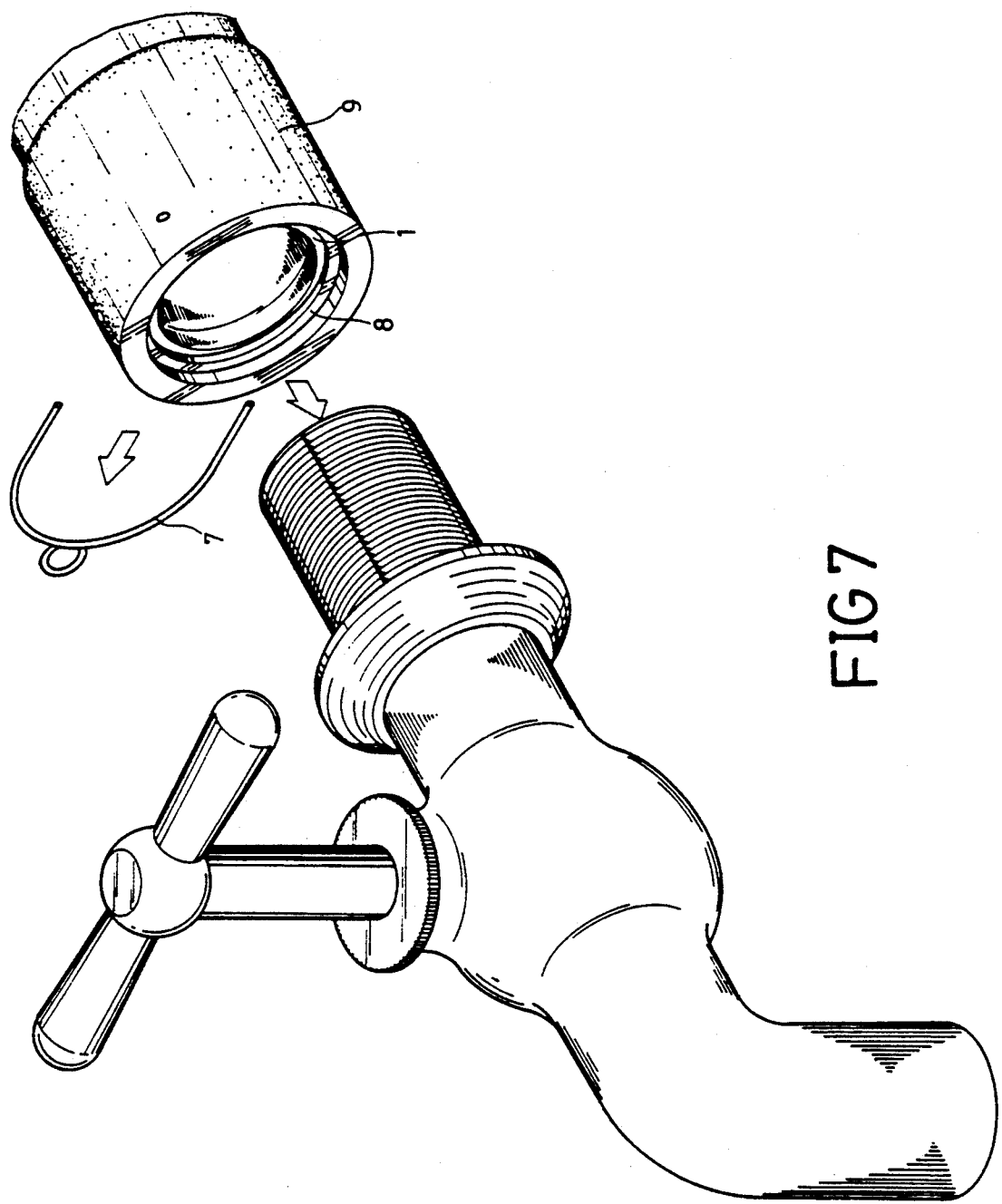
FIG. 7 is a perspective view showing one use of the fitting of this invention.

It can fully develop its practical effect for common application as shown on FIG. 6 and FIG. 7. The achievable effect of this joint can easily complete its replacement procedure demanded for the faucet used at family or business place without any additional tool, shutting off the water supply. They can be easily removed and replaced by a spare new faucet by the user promptly and conveniently.

Concluded from afore-mentioned description, the main purpose of this invention is to provide a fast connection fitting which can be connected to an outlet without shutting off water the supply or using additional tools. The user can easily plug in or pull out an external pipe or faucet to complete outlet connection or disconnection of.

The secondary purpose of this invention is to use the components such as an expansion ring, claw check ring and snake tail ring to make this fast connection joint such that the claw check ring with snake tail ring seals the outside diameter of an insertion pipe. Removal of the pin enables the claw check ring to move backward to release the clamping of the insertion pipe.

Another purpose of this invention is to utilize filter ring and swing check valve so as to force the water to pass through filtration material packed in filter ring. Furthermore, the filter ring can be moved to hold the check valve open and let water flow through. Internal water pressure will reset the check valve to its closed position when pulling out the insertion pipe to automatically shut off the water flow. No phenomena of spraying water in large volume will occur.

It will fully develop its prominent effect to supply water automatically when an external pipe or faucet is inserted and will seal water automatically when the fitting is disconnected.

I claim:

1. A fast connection joint for a fitting outlet comprising:
   a) a hollow conduit connection joint housing having a first flow inlet end and a second flow outlet end, said housing having an inner surface;
   b) a swing check valve means pivotally mounted adjacent said first end of said housing for blocking flow into said housing when not biased into an open position;
   c) a filter ring with water filtration material internally packed therein, said filter ring is slideably mounted to the inner surface of said connection joint housing and abutting the swing check valve means and adapted to be moved by contact with an insertion pipe inserted into the connection joint through said second end, such movement opening the check valve means upon insertion of the pipe and allowing the closing of the swing check valve means upon withdrawal of the pipe;
   d) a snake tail ring having an annular configuration placed between an outer surface of the filter ring and the inner wall of the connection joint housing and having a rolling-ball-shaped ball ring defining a pass hole and having an internal surface defining a plurality of annular slots so that internal and external surface are non-uniformly stressed such that the ball ring will curl inward when contacted by an insertion pipe entering the pass hole of ball ring;
   e) a claw check ring engaging the inner surface of the connection joint housing adjacent to the snake tail ring toward the second end and front tip notched to form claw ring's teeth which are directed toward said first end and said teeth defining a pass hole formed by the teeth tips adapted to elastically clamp an insertion pipe's outside diameter and a tail foil means connected to front tips for engaging the inner surface of the connection joint housing to prevent movement of the claw check ring toward said first end and allow movement of the claw check ring toward said second end;
   f) an open-ended, hollow, generally frustoconical shaped expansion ring having an annular base portion abutting the inner surface of the housing near said second end and having an inwardly tapered top portion directed toward said first end and said top portion extending adjacent to the claw ring teeth of the claw check ring, the top portion of the expansion ring defining a pass hole so that an insertion pipe can pass through the expansion ring, whereby the top portion will open the claw ring teeth when the claw check ring is moved toward said second end;
   g) a U shaped ring extending into the connection joint housing and into an annular area defined between the tapered top portion of the expansion ring and the housing inner surface and located adjacent to where the claw ring engages the inner surface of the housing; and
   h) a snap ring means attached to the connection joint housing and abutting the base of the expansion ring adjacent to the second end of the housing for preventing movement of the expansion ring toward said second end.

\* \* \* \* \*